Figure 1:

May 7, 1963 F. M. CAIN, JR., ET AL 3,088,892
DISPERSION ELEMENT CONSISTING OF CHROMIUM COATED
$UO_2$ PARTICLES UNIFORMLY DISTRIBUTED
IN A ZIRCALOY MATRIX
Filed May 5, 1960

INVENTORS
FRANCIS M. CAIN, JR.
JOHN E. ECK
BY

United States Patent Office 3,088,892
Patented May 7, 1963

3,088,892
DISPERSION ELEMENT CONSISTING OF CHROMIUM COATED $UO_2$ PARTICLES UNIFORMLY DISTRIBUTED IN A ZIRCALOY MATRIX
Francis M. Cain, Jr., and John E. Eck, Apollo, Pa., assignors to the United States of America as represented by the United States Atomic Energy Commission
Filed May 5, 1960, Ser. No. 27,227
5 Claims. (Cl. 204—154.2)

This invention relates to dispersion type fuel elements for nuclear power reactors, and refers in particular to dispersion type elements utilizing $UO_2$ as the fissile material.

The need for greater efficiency and lower cost in the production of nuclear power necessitates the development of fuel elements that will operate at higher temperatures and higher burn-ups than the conventional elements now in use. In addition, these elements should possess the greatest corrosion resistance possible. The dispersion type fuel element, in which the fissile material is uniformly dispersed in a continuous nonfissile matrix, is one of the more promising ways of meeting these requirements.

The proper selection of fissile and nonfissile materials to be used in a dispersion type fuel element involves the consideration of many factors. Of primary importance are compatibility of the fissile and nonfissile phases at both fabricating and operating temperatures, the neutron absorption cross section of both fuel and matrix, corrosion resistance of the nonfissile phase, weight percentage of the uranium in the fissile phase, and density of the uranium compound.

To meet the requirements of high-temperature strength, high burn-up, and good corrosion resistance, the fuel element designer must develop a fuel system that utilizes a diluent of relatively high melting point, has a minimum thermal neutron absorption cross-section, has good corrosion resistance in its operating environment, is subject to minimum radiation damage, and is capable of retaining fission products.

Dispersion type fuel elements in general meet all these requirements. They offer higher burn-ups through localization of fission-product damage to the fissile phase or to the area immediately adjacent to it, leaving a fission-product-free region of matrix metal around the zone of damage. The continuous nonfissile matrix in this type of element offers increased corrosion resistance. A dispersion system also offers a wide choice of fuel-element materials and properties.

The ideal dispersion element incorporates the fissile material without any metallurgical reaction and consequently retains the desirable properties of the matrix material which provides the structural strength to the fuel element. Since uranium itself is a highly reactive element, the fissile addition is usually made of a relatively high-density chemically stable compound such as $UO_2$.

Heretofore the choice of a matrix material has been limited to materials such as stainless steel which will not react with $UO_2$ at operating temperatures. While zircaloy has long been regarded as an ideal matrix material, its use with $UO_2$ has been prevented since it reacts with $UO_2$ at high temperatures.

While the reaction between zirconium and $UO_2$ at 1000° F. is negligible, a measurable reaction takes place at 1300° F. and at 2000° F., the reaction is very rapid. $UO_2$ seems to be reduced to its elements, uranium and oxygen, which diffuse simultaneously but not with equal speed into the zirconium. The diffusion of oxygen into the zirconium results in a hard zirconium-oxygen solid solution.

A further difficulty results from the breaking up of the $UO_2$ particles during fabrication of the dispersion element. This breaking up is referred to as stringering and is highly deleterious to the fuel element.

With the foregoing deficiencies of the prior art in mind, it is the object of this invention to produce a dispersion type nuclear reactor fuel element in which $UO_2$ forms the fissile phase and zircaloy, the matrix material. The dispersion element is characterized by the use of metal-coated $UO_2$ particles whereby any reaction between $UO_2$ and zirconium is prevented. The metal coating further strengthens the $UO_2$ particles so that they do not become crushed or stringered in the course of manufacture of the fuel element.

Figure 2:
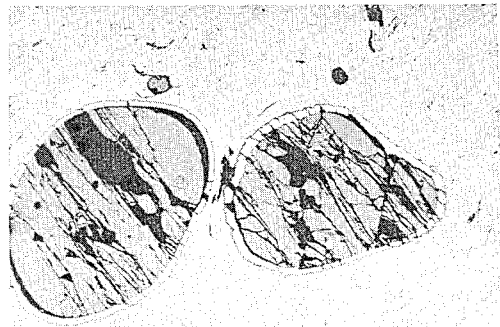

The fuel element of this invention may be better understood by reference to the figures in which:

FIG. 1 is an X-ray photograph showing distribution of coated $UO_2$ particles in a zircaloy matrix, and FIG. 2 is a polished section of FIG. 1 enlarged 75 times and showing $UO_2$ particles coated with chromium.

In preparing $UO_2$ for use in accordance with the teachings of this invention, it is first necessary to provide the $UO_2$ in the form of pebble-shaped or spheroidal particles. Such particles preferably have an average dimension of between 40 and 300 microns. These particles are then coated with a metal which will not react with zircaloy. Such a coating should have a thickness of not less than 3 or more than 150 microns and may consist of metal such as niobium, chromium, nickel, molybdenum or tungsten.

It is important that the coating on the $UO_2$ should be continuous if the advantages of this invention are to be fully realized.

PREPARATION OF $UO_2$ PARTICLES

The preparation of the spheroidal $UO_2$ particles may follow in general the standard ceramic techniques practiced in most ceramic laboratories. Ceramic grade $UO_2$ powder of good sinterability is sufficiently ball milled to assure uniform small particle size. Approximately 10% water and 2% to 3% of a binder is added and stirred into a paste. The quantity of material is limited to less than ½ the limited-safe-mass of enriched $UO_2$. This batch of pasty powder is then dried to about 3% total volatile content and screened through the appropriate standard sieves to yield a powder that is approximately 15% larger than the desired final size. The green powder is then returned into a drum or small mill for rolling. The latter operation assures better shapes and rounds off some of the sharp corners of the screened powder. After rolling for about 24 hours, the material is fired in a hydrogen atmosphere for about 4 hours at 1650° C. The resultant hi-fired $UO_2$ particles are nearly all within the required size and sufficiently rounded to cause no difficulty in the coating operation. A final sieving operation filters out the specified particle size range; for example —100+140 mesh. Density of the particles as measured by pycnometer technique is usually between 94 and 97% of theoretical.

COATING THE $UO_2$ PARTICLES

Since coated particles can be applied in a great variety of reactor types, i.e.: thermal, epithermal and fast; water, liquid metal, or gas cooled; and at low, intermediate or high temperatures, the metals that may be used for coating include elements of comparatively high as well as low thermal absorption cross-section. Those metals include niobium, chromium, nickel, iron, copper, molybdenum and tungsten.

Depending on the metal selected, the coating of $UO_2$ may be accomplished by a number of techniques including chemical displacement, reduction of the halides, reduction of the oxides, decomposition of the iodides, or the carbonyls, evaporation, and electroplating from aqueous or molten salt solutions.

$UO_2$ may be coated with nickel by immersion coating from a hypophosphite bath that depends on the autocatalytic reduction of the hypophosphite. Alternatively a coating may be obtained by decomposition of nickel carbonyl.

Niobium coatings may be obtained by the reduction of niobium pentachloride with hydrogen. While other niobium halides such as $NbF_5$, $NbBr_5$, $NbI_5$ may be used, the reduction of the pentachloride is deemed to be the most direct and economical method of obtaining high purity metal in a process applicable to the coating of ceramic spheres.

Tungsten and molybdenum coats require the use of a vapor phase deposition since there is no successful electrodeposition method available. The processes used consist in the thermal decomposition of molybdenum carbonyl or, in the alternative, hydrogen reduction of the volatile fluoride according to the following formula:

$$Mo(Co)_6 \rightarrow Mo + 6Co$$
$$MoCl_5 + 2.5H_2 \rightarrow Mo + 5HCl$$

Niobium-vanadium alloy coats can be obtained by hydrogen reduction of the respective chlorides, either by co-deposition or by applying alternate layers with a subsequent diffusion treatment.

Chromium coatings are achieved by a reduction of chromous iodide, decomposition of chromic carbonyl and electrolysis.

A successful process for coating $UO_2$ with chromium consists of heating a mixture of chromic chloride, quartz chips and nickel-coated $UO_2$ spheres to a temperature of about 750° C. in a hydrogen atmosphere. Under these conditions, the chromic chloride is reduced to chromous chloride which by intimate contact with the $UO_2$ spheres deposits a chromium coat. The quartz chips prevent the formation of agglomerates.

FABRICATION OF $UO_2$-ZIRCONIUM DISPERSION FUEL ELEMENTS

Using $UO_2$ particles which have been coated by one of the methods described above, a dispersion type fuel element can be made utilizing zircaloy as the matrix material. In such elements, the coating on the $UO_2$ prevents any reaction with the zirconium. The coating further improves the thermal conductivity of the fuel element, assists in the retention of fission products and strengthens the $UO_2$ particles to a point where they can withstand the fabricating pressures and temperatures without crushing or stringering. While particles coated with any of the materials previously described may be incorporated into the fuel element, the invention will be described with specific reference to $UO_2$ particles which have been coated with chromium.

Example

Roughly spherical particles of about 500 microns diameter were coated with chromium by vapor deposition to a thickness of 5 to 6 microns. Five grams of these were then blended with 45 grams of −60 +270 mesh Zircaloy-2 powder (50–250 microns) that was prepared from an ingot by mechanical attrition. The mixture was then cold pressed at 40 t.s.i. into a 0.780 in. diameter Zircaloy-2 tube and closed with 0.25 inch thick Zircaloy-2 end plugs. After trimming the excess tubing from the end, the compact was enclosed in a copper jacket, evacuated and sealed. The billet was then heated to 1375° F. and extruded at a ratio of 25 to 1 into a rectangular Zircaloy-2 covered strip. X-ray pictures of the finished strip after rolling to size (FIG. 1) reveal that the particles have retained their identity and that they have gone through the strenuous fabrication process without stringering as might have been expected. It is further noted on the X-ray that the distribution of the particles was as uniform as could be expected. FIG. 2 shows that the chromium coats were retained by the particles and that because of the protection afforded by these coats, all reactions between the $UO_2$ and Zircaloy-2 were prevented during the fabrication process. These processes involved higher temperatures than are contemplated for such an element during its life in a power reactor.

It will be seen that by means of our invention, a new dispersion type fuel element for use in nuclear reactors has been provided in which all reaction between $UO_2$ and zirconium is prevented and in which no stringering of the $UO_2$ takes place. Our improved fuel element has the further advantage of improved thermal conductivity resulting from the use of metal coatings on the $UO_2$. These coatings have the further advantage of retaining fission products.

We claim:

1. An extruded dispersion type nuclear fuel element consisting of spheroidal particles of uranium dioxide, said particles being in the range of about 40 to 500 microns in size, a continuous metal coating on said particles said coating being in the range of about 3 to 150 microns in thickness and unreactive with uranium dioxide and zircalloy at normal reactor operating temperatures, a matrix of zircalloy surrounding the coated particles and zircalloy cladding surrounding said matrix.

2. A nuclear reactor fuel element as set forth in claim 1, wherein the metal coating on the $UO_2$ comprises chromium.

3. A nuclear fuel element as set forth in claim 1, wherein the metal coating on the $UO_2$ particle consists of niobium.

4. A nuclear fuel element as set forth in claim 1, wherein the metal coating on the $UO_2$ particle consists of beryllium.

5. A nuclear fuel element as set forth in claim 1, wherein the metal coating on the $UO_2$ particle consists of nickel.

References Cited in the file of this patent

UNITED STATES PATENTS

| | | |
|---|---|---|
| 2,969,309 | Finniston et al. | Jan. 24, 1961 |
| 2,990,352 | Finniston et al. | June 27, 1961 |
| 3,009,809 | Neri | Nov. 21, 1961 |

OTHER REFERENCES

Proceedings of International Conference on the Peaceful Uses of Atomic Energy, Geneva, August 1955, vol. 9, pages 201 and 202.

The Soviet Journal of Atomic Energy, vol. 6, No. 2, September 1960, pages 73–74; originally appearing in Atomnaya Energiya February 1959, pages 135–140.

Nuclear Science Abstract, vol. 13, No. 15, July-August 1959, page 1821 Note 13568.

Proceedings of the International Conference on the Peaceful Uses of Atomic Energy Held in Geneva, August 20, 1955, vol. 9, pages 196–200.